United States Patent
Weigell et al.

(10) Patent No.: US 11,239,688 B2
(45) Date of Patent: Feb. 1, 2022

(54) POWER SUPPLY UNIT WITH ADAPTIVE FEEDBACK CONTROL

(71) Applicant: Rohde & Schwarz GmbH & Co. KG, Munich (DE)

(72) Inventors: Philipp Weigell, Baierbrunn (DE); Sascha Kunisch, Haibach (DE); Andreas Schuetz, Karlstein (DE); Juergen Waldschmitt, Moenchberg (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 128 days.

(21) Appl. No.: 16/706,267

(22) Filed: Dec. 6, 2019

(65) Prior Publication Data
US 2021/0175739 A1   Jun. 10, 2021

(51) Int. Cl.
*H02J 9/00*     (2006.01)
*H02M 3/158*   (2006.01)

(52) U.S. Cl.
CPC .......... *H02J 9/005* (2013.01); *H02M 3/158* (2013.01)

(58) Field of Classification Search
CPC ............................... H02J 9/005; H02M 3/158
USPC ........................................................... 307/64
See application file for complete search history.

(56) References Cited

U.S. PATENT DOCUMENTS

| | | | |
|---|---|---|---|
| 7,327,125 B2 * | 2/2008 | Benbrik | G05F 1/565 323/269 |
| 8,922,183 B2 * | 12/2014 | Dearborn | H02M 3/1588 323/283 |

FOREIGN PATENT DOCUMENTS

| | | |
|---|---|---|
| EP | 1853985 A2 | 11/2007 |
| EP | 2659578 A2 | 11/2013 |
| WO | 2006089195 A2 | 8/2006 |
| WO | 2012091979 A3 | 7/2012 |

* cited by examiner

Primary Examiner — Hal Kaplan
(74) Attorney, Agent, or Firm — Ditthavong, Steiner & Mlotkowski

(57) ABSTRACT

A power supply unit, preferably for a power analyzer, a power analyzer comprising a power supply unit and a method for operating a power supply unit, wherein the power supply unit comprises a feedback control unit controlling the output level of the voltage, the current or the power supplied to output terminals of the power supply unit on a preset value, means for sensing the actual output level of the voltage, the current or the power, respectively, and sending a signal representing the sensed output level to said feedback control unit, and means for detecting oscillations in the actual output of the voltage, the current or the power, respectively and for issuing an oscillation detection signal to the feedback control unit, wherein the feedback control unit is arranged to adapt at least one parameter value of the feedback control in response to a value of the oscillation detection signal.

15 Claims, 3 Drawing Sheets

Figure 1:
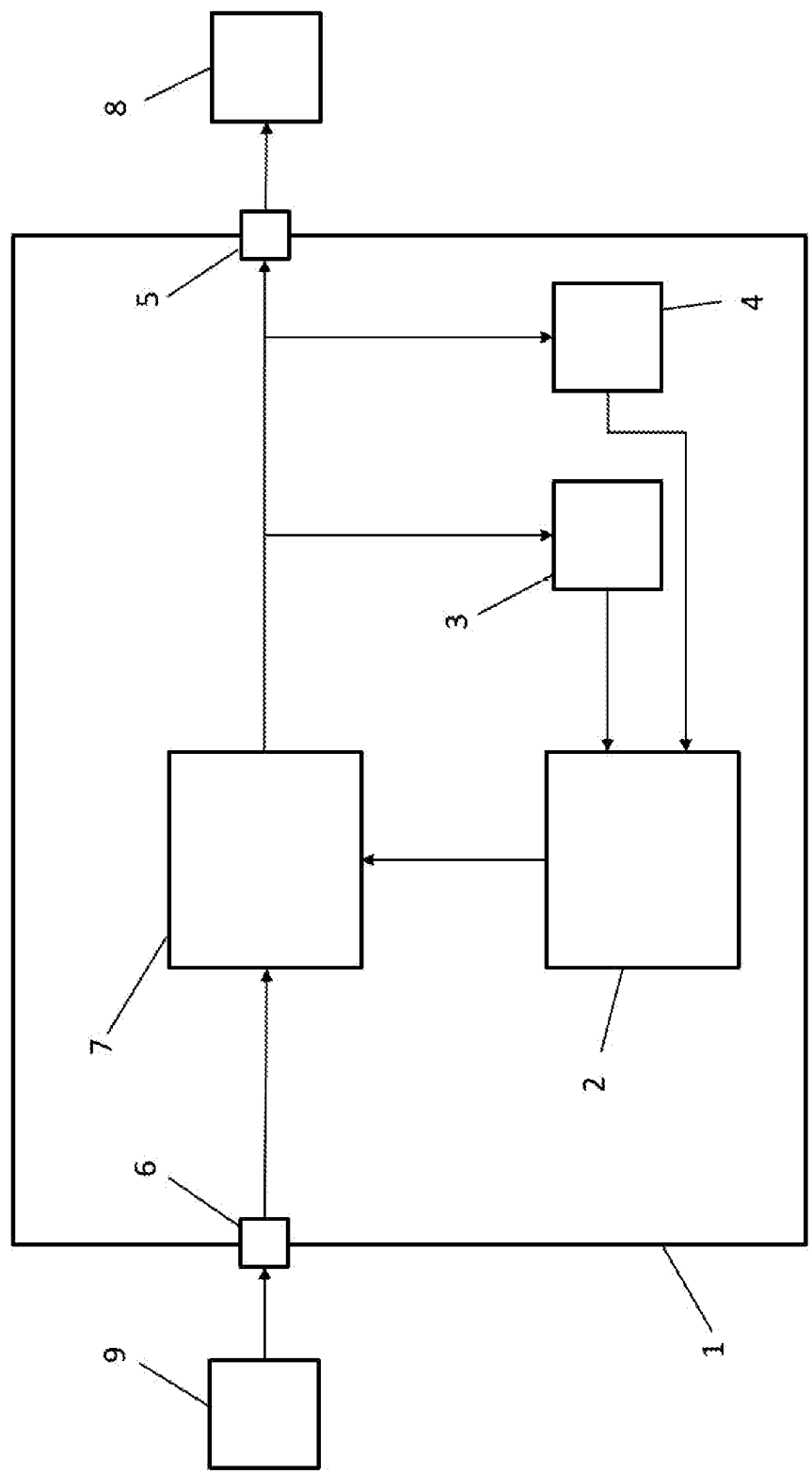

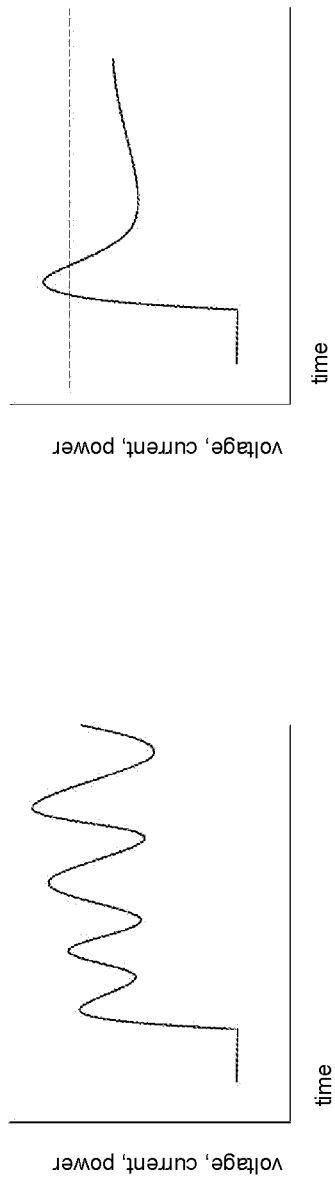
Fig. 3
Fig. 4
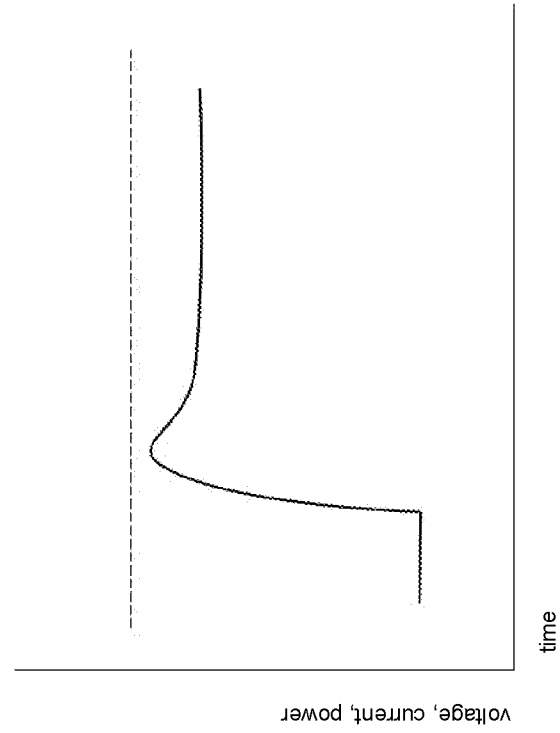
Fig. 5

POWER SUPPLY UNIT WITH ADAPTIVE FEEDBACK CONTROL

The present invention relates to a power supply unit, preferably for a power analyzer, a method for operating a power supply unit and a power analyzer comprising a power supply unit, wherein the power supply unit comprises a feedback control unit controlling the output level of the voltage, the current or the power supplied to output terminals of the power supply unit on a preset value, means for sensing the actual output level of the voltage, the current or the power, respectively, and sending a signal representing the sensed output level to said feedback control unit, and means for detecting oscillations in the actual output of the voltage, the current or the power, respectively, and for issuing an oscillation detection signal to the feedback control unit.

A power supply or a power supply unit is a device or assembly for supplying power to devices or assemblies, like an electrical or electronic load, that requires different voltages and currents than those provided by a source, like mains supply or batteries. Some power supply units are separate, standalone pieces of equipment, while others are built into the load appliances that they power. Power supply units are also referred to as electric power converters, since the main function of a power supply unit is to convert electric current from the source to the correct voltage, current and/or frequency to power the connected electric load.

Power supply units are used in and for a great variety of different electric and electronic devices. One of them are power analyzers. A power analyzer is used to measure the flow of power in an electrical system. Power analyzers are able to measure a variety of parameters associated to power consumption and generation. Power analyzers are used for measuring a host of aspects of electrical power for applications, which include testing power electronics, inverters, motors and drives, lighting, home appliances, office equipment, industrial machinery and more.

Power supply units are categorized in various ways. One type of a power supply unit is a DC power supply unit, wherein the most common one is a switched-mode power supply (SMPS). The SMPS is powered from a DC source or from an AC source and supplies constant DC voltage to its load. In a SMPS the AC mains input is directly rectified and then filtered to obtain a DC voltage. The resulting DC voltage is then switched on and off at a higher frequency by electronic switching, thus producing an AC current that will pass through a high frequency transformer or inductor. After the inductor or transformer secondary, the high frequency AC is rectified and filtered to produce the DC output voltage.

A SMPS is for example described in the EP 2 659 578 A2. From there, it is derivable that an uncontrolled source of voltage (or current, or power) is applied to the input of a power system with the expectation that the voltage (or current, or power) at the output will be very well controlled, wherein the basis of controlling the output is to compare it to some form of reference, and any deviation between the output and the reference becomes an error. In this document beneath others a feedback control is described, wherein negative feedback is used to reduce an error to an acceptable value, as close to zero as is required by the system.

Another power supply is described in the EP 1 853 985 A2, which comprises a voltage control loop and a current control loop. In more detail, from this document a power supply circuit is known that includes two pass transistors that conduct current from a voltage supply terminal to an output terminal, wherein one of the pass transistors is smaller whereas the other is larger. In this document, current through the smaller transistor is controlled by the voltage control loop such that the voltage on the output terminal is regulated to a predetermined voltage, and current through the larger transistor is controlled by a high gain current control loop such that the current flowing through the larger transistor is a multiple of the current flowing through the smaller pass transistor.

A problem that can arise in the above described power supply units or general in power supply units is that a control behavior of the power supply unit is not correctly tuned to the load/load impedance connected to the power supply unit. When the control behavior is not correctly tuned, an oscillation or even an oscillation circuit can be the result, which can falsify the measurement in a feedback loop or even destroy the power supply unit/load. This is in particular a problem when the load varies, for example in case when using the power supply unit together with or in a power analyzer, which is connected to a great variety of different loads.

In general, when a stationary process is excited by a sudden change (like a load change) a free oscillation occurs and, as a result of damping (according to, for example, feedback control), a new stationary process decays (oscillating) or becomes aperiodic (creeping). In particular, a (large) load change leads for example to an output voltage transient oscillation due to necessary adjustment processes. In case, as mentioned above, the control behavior of the power supply unit/feedback loop is not correctly tuned to the changed load, it could happen that the oscillation exceeds a desired threshold, as it is shown exemplarily in FIG. 4, or it is even possible that an oscillation circuit can be the result, as it is shown exemplarily in FIG. 3. Both cases can falsify the measurement in a feedback loop or even destroy the power supply unit/load.

Presently, such a problem is addressed by manual selection from various modes (e.g. Keysight) on the device or by manual compensation.

It is an object of the present invention to provide a power supply unit that allows a change of a load avoiding that an oscillation exceeds a desired threshold or an oscillation circuit is created/is the result, without manual selection or manual compensation. Thus, the object of the present invention is an optimization of the transient behavior with changing load impedance.

This object is achieved by means of the features of the independent claims. The dependent claims further develop the central idea of the present invention.

The present invention relates to a power supply unit, preferably for a power analyzer, comprising a feedback control unit controlling the output level of the voltage, the current or the power supplied to output terminals of the power supply unit on a preset value, means for sensing the actual output level of the voltage, the current or the power, respectively, and sending a signal representing the sensed output level to said feedback control unit, and means for detecting oscillations in the actual output of the voltage, the current or the power, respectively and for issuing an oscillation detection signal to the feedback control unit, wherein the feedback control unit is arranged to adapt at least one parameter value of the feedback control in response to a value of the oscillation detection signal.

Advantageously, the feedback control unit is arranged to adapt at least one parameter of the feedback control in response to a value of the oscillation detection signal such that the value of the oscillation detection signal falls below a given threshold value.

The feedback control unit can be also arranged to adapt at least one parameter of the feedback control by adjusting said parameter or by selectively activating a parameter value out of a given set of a plurality of values for said parameter.

In a preferred embodiment, the feedback control unit is arranged to set an adapted parameter value depending as a function of the value of the oscillation detection signal.

The feedback control unit can also be arranged to incrementally adapt said at least one parameter value of the feedback control until a given stop criterion is met, wherein the stop criterion can be the value of the oscillation detection signal falling under a given threshold value.

Advantageously, the power supply unit is a DC power supply and the feedback control unit comprises an analogue or a digital control algorithm.

The present invention further relates to a power analyzer comprising the above power supply unit.

The present invention further relates to a method for operating a power supply unit, preferably for a power analyzer, comprising feedback controlling the output level of the voltage, the current or the power supplied to an output of the power supply unit on a preset value, sensing the actual output level of the voltage, the current or the power, respectively, for the feedback controlling, detecting oscillations in the actual output of the voltage, the current or the power, respectively, adapting at least one parameter value of the feedback controlling in response to a value of the detected oscillation.

Advantageously, the adapting at least one parameter value of the feedback controlling further comprises adapting at least one parameter of the feedback controlling in response to a value of the detected oscillation such that the value of the detected oscillation falls below a given threshold value.

The adapting at least one parameter value of the feedback controlling can also further comprise adapting at least one parameter of the feedback controlling by adjusting said parameter or by selectively activating a parameter value out of a given set of a plurality of values for said parameter.

In a preferred embodiment, the adapting at least one parameter value of the feedback controlling further comprises setting an adapted parameter value depending as a function of the value of the detected oscillation.

The adapting at least one parameter value of the feedback controlling can also further comprise incrementally adapting said at least one parameter value of the feedback controlling until a given stop criterion is met, wherein the stop criterion can be the value of the detected oscillation falling under a given threshold value.

By the power supply unit and the method for operating a power supply unit of the present invention, not only the actual output level of the voltage, the current or the power is sensed/measured, but also a possible oscillation in the actual output of the voltage, the current or the power is detected and then in case the detected oscillations are exceeding a desired threshold or an oscillation circuit is created, a parameter value of the feedback control is adapted, so that oscillations are not exceeding a desired threshold and no oscillation circuit is created, and thus, the measurement is not falsified and the power supply unit/load is not destroyed.

Figure 2:
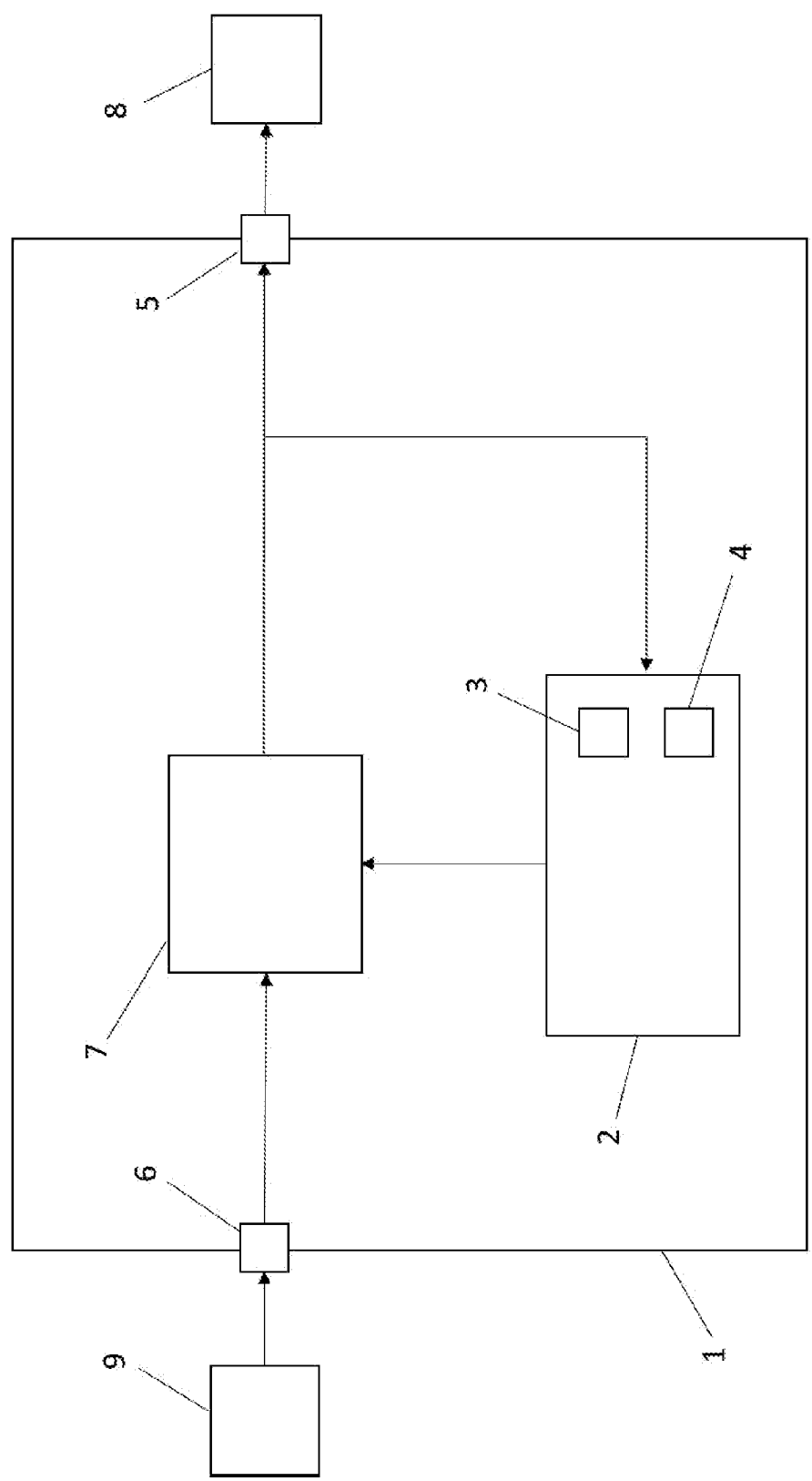

These and other aspects and advantages of the present invention will become more apparent when studying the following detailed description, in connection with the figures in which:

FIG. 1 shows schematically a power supply unit;
FIG. 2 shows schematically another power supply unit;
FIG. 3 shows schematically a diagram of a load change and a resulting oscillation circuit;
FIG. 4 shows schematically a diagram of a load change and a resulting oscillation;
FIG. 5 shows schematically a diagram of a load change and a resulting oscillation.

As already described above a power supply unit for example used in or for a power analyzer can have the problem that in case of a (large) change of the load/load impedance, the control behavior of the power supply unit/feedback loop is not correctly tuned to the changed load. It could then happen that an oscillation occurs that exceeds a desired threshold, as it is shown exemplarily in FIG. 4, or it is even possible that an oscillation circuit is created, as it is shown exemplarily in FIG. 3. Both cases can falsify measurements or even destroy parts of the power supply unit or the load.

The present invention now optimizes the transient behavior with a changing load. Therefore, as shown in FIG. 1, a power supply unit 1 according to the present invention includes a feedback control unit 2 controlling the output level of the voltage, the current or the power supplied to the output terminals 5 of the power supply unit 1 on a preset value.

The feedback control unit 2 is therefore connected to a power circuit or power unit 7, wherein the power circuit 7 converts an electric current from a source 9 connected to input terminals 6 to the correct voltage, current and frequency to power a load 8 connected to the output terminals 5, wherein the power circuit 7 is connected to the input terminals 6 for receiving for example an electric current from the source 9 and is connected to the output terminals 5 for outputting the voltage, the current or the power for the load 8. The power circuit 7 is then controlled by the feedback control unit 2.

Regarding the load 8, it should be noted that the load 8 can be for example a power analyzer, wherein the power supply unit 1 can be integrated together with the power analyzer in one housing or can be separately provided in an own housing. Further, it is possible that power supply unit 1 does not only provide to the power analyzer but also to a device under test (DUT) connected to the power analyzer voltage, current or power. In this case, the load 8 is therefore the power analyzer together with the DUT.

The power supply unit 1 further comprises means 3 for sensing the actual output level of the voltage, the current or the power supplied to the output terminals 5, and sending a signal representing the sensed output level to the feedback control unit 2. The means 3 for sensing the actual output level are connected to the output of the power circuit 7. With the signaling representing the sensed output level received from the means 3 for sensing the actual output level, the feedback control unit 2 can then control the power circuit 7 and thus the voltage, the current or the power supplied at the output of the power circuit 7 and thus, at the output terminals 5 for the load 8.

Therefore, as can be also seen from FIG. 1, the means 3 for sensing the actual output level and the feedback control unit 2 form a feedback loop or control loop similar to them already known from the prior art. Thus, in case for example of a SMPS, the feedback control unit 2 controls the switching of the DC voltage in the power circuit 7.

In addition, according to the present invention, the power supply unit 1 further comprises means 4 for detecting oscillations in the actual output of the voltage, the current or the power and for issuing an oscillation detection signal to the feedback control unit 2. Similar as the means 3 for sensing the actual output level, the means 4 for detecting oscillations are connected to the output of the power circuit 7.

By this oscillation detection signal of the means 4 for detecting oscillations, the feedback control unit 2 can then adapt at least one parameter value of the feedback control. It is therefore possible, that by measuring/detecting oscillations in the actual output and by adapting at least one parameter value of the feedback control, an optimization of the transient behavior is reached, which means that for example in case of a load change that leads to an output transient oscillation due to necessary adjustment processes, the oscillation is reduced or avoided if necessary so that the oscillation does not exceed a desired threshold and no oscillation circuit is created.

In more detail, the feedback control unit 2 can for example adapt at least one parameter of the feedback control in response to a value of the oscillation detection signal such that the value of the oscillation detection signal falls below a desired/given threshold value. This threshold is in particular determined based on requirements of a possible load as well as of the components of the power supply unit (for example keeping a possible load or the components in an optimal working range or keeping a possible load or the components in a working range, which does not destroy them).

In the FIGS. 4 and 5 such a threshold is illustrated by the dashed line, wherein in FIG. 4 it is shown that the oscillation exceeds a desired threshold after a load change, whereas in FIG. 5 the oscillation no longer exceeds a desired threshold after a load change due to the adaption, by the feedback control unit 2, of at least one parameter of the feedback control in response to a value of the oscillation detection signal.

In FIG. 3 an oscillation circuit as a result of a load change is shown. Also in such a case it is possible by the power supply unit 1 according to the present invention that the value of the oscillation detection signal falls below a given threshold value and thus, the oscillation is below the threshold as shown in FIG. 5.

Alternatively or additionally, the feedback control unit 2 can also adapt at least one parameter of the feedback control by adjusting the parameter or by selectively activating a parameter value out of a given set of a plurality of values for the parameter. The adjusting of the parameter or the selectively activating a parameter value is done in such a way that the oscillation is reduced or avoided, so that for example the oscillation is at least below a threshold similar to the above as shown in FIG. 5.

Alternatively or additionally, the feedback control unit 2 can set an adapted parameter value depending as a function of the value of the oscillation detection signal or can incrementally adapt said at least one parameter value of the feedback control until a given stop criterion is met, wherein the stop criterion can be the value of the oscillation detection signal falling under a given threshold value similar to them above as shown in FIG. 5.

In the power supply unit 1 shown in FIG. 1 the means 3 for sensing the actual output level and the means 4 for detecting oscillations are positioned separately from each other and the feedback control unit 2. Further, they are also connected separately to the output of the power circuit 7 and to the feedback control unit 2.

It would be, however, also possible that the means 3 for sensing the actual output level and the means 4 for detecting oscillations are placed together in one housing separately from the feedback control unit 2, wherein then only one connection to the output of the power circuit 7 exists and also only one connection to the feedback control unit 2.

Alternatively, the means 3 for sensing the actual output level and the means 4 for detecting oscillations can be placed in the feedback control unit 2, wherein then only a connection from the output of the power circuit 7 to the feedback control unit 2 exists. This is illustrated in FIG. 2, which shows a power supply unit 1 similar to that shown in FIG. 1, comprising a feedback control unit 2, means 3 for sensing the actual output level, means 4 for detecting oscillations, output terminals 5, input terminals 6 and a power circuit 7, wherein the power circuit 7 converts an electric current from a source 9 connected to input terminals 6 to the correct voltage, current and frequency to power a load 8 connected to the output terminals 5. The only difference between the power supply unit 1 in FIG. 2 and the power supply unit 1 in FIG. 1 is that in the power supply unit 1 in FIG. 2 the means 3 for sensing the actual output level and the means 4 for detecting oscillations are placed in the feedback control unit 2. Otherwise the power supply unit 1 in FIG. 2 and the power supply unit 1 in FIG. 1 work in a similar way.

Further, it would be also possible that one of the means 3 for sensing the actual output level and the means 4 for detecting oscillations are placed separately from the feedback control unit 2 as shown in FIG. 1 and the other ones are placed in the feedback control unit 2 as shown in FIG. 2.

The feedback control unit 2 can be for example a microcontroller or microprocessor.

Regarding the load 8, it should be noted that the load 8 can be integrated together with the power supply unit 1 in one housing or the power supply unit 1 can be separately provided in an own housing.

By the present invention it is therefore in particular possible, to optimize the transient behavior with changing load impedance and get a correct result when using a power supply unit together with a power analyzer at a circuit or a load, since with measuring/detecting oscillations in the actual output and adapting by the feedback control unit 2 at least one parameter value of the feedback control in response to a value of the oscillations detection signal, the power supply unit automatically can adjust its control loop until a stable optimum is obtained.

What is claimed is:

1. A power supply unit, comprising:
    a feedback control unit controlling the output level of the voltage, the current or the power supplied to output terminals of the power supply unit on a preset value,
    means for sensing the actual output level of the voltage, the current or the power, respectively, and sending a signal representing the sensed output level to said feedback control unit, and
    means for detecting oscillations in the actual output of the voltage, the current or the power, respectively and for issuing an oscillation detection signal to the feedback control unit,
    wherein the feedback control unit is arranged to adapt at least one parameter value of the feedback control in response to a value of the oscillation detection signal.

2. The power supply unit of claim 1, wherein the feedback control unit is arranged to adapt at least one parameter of the feedback control in response to a value of the oscillation detection signal such that the value of the oscillation detection signal falls below a given threshold value.

3. The power supply unit of claim 1, wherein the feedback control unit is arranged to adapt at least one parameter of the feedback control by adjusting said parameter or by selectively activating a parameter value out of a given set of a plurality of values for said parameter.

4. The power supply unit of claim 1, wherein the feedback control unit is arranged to set an adapted parameter value depending as a function of the value of the oscillation detection signal.

5. The power supply unit of claim 1, wherein the feedback control unit is arranged to incrementally adapt said at least one parameter value of the feedback control until a given stop criterion is met.

6. The power supply unit of claim 5, wherein the stop criterion is the value of the oscillation detection signal falling under a given threshold value.

7. The power supply unit of claim 1, which is a DC power supply.

8. The power supply unit of claim 1, wherein the feedback control unit comprises an analogue or a digital control algorithm.

9. A power analyzer comprising a power supply unit according to claim 1.

10. A method for operating a power supply unit, comprising:
   feedback controlling the output level of the voltage, the current or the power supplied to an output of the power supply unit on a preset value,
   sensing the actual output level of the voltage, the current or the power, respectively, for the feedback controlling,
   detecting oscillations in the actual output of the voltage, the current or the power, respectively, and
   adapting at least one parameter value of the feedback controlling in response to a value of the detected oscillation.

11. The method of claim 10, wherein the adapting at least one parameter value of the feedback controlling further comprises:
   adapting at least one parameter of the feedback controlling in response to a value of the detected oscillation such that the value of the detected oscillation falls below a given threshold value.

12. The method of claim 10, wherein the adapting at least one parameter value of the feedback controlling further comprises:
   adapting at least one parameter of the feedback controlling by adjusting said parameter or by selectively activating a parameter value out of a given set of a plurality of values for said parameter.

13. The method of claim 10, wherein the adapting at least one parameter value of the feedback controlling further comprises:
   setting an adapted parameter value depending as a function of the value of the detected oscillation.

14. The method of claim 10, wherein the adapting at least one parameter value of the feedback controlling further comprises:
   incrementally adapting said at least one parameter value of the feedback controlling until a given stop criterion is met.

15. The method of claim 14, wherein the stop criterion is the value of the detected oscillation falling under a given threshold value.

* * * * *